United States Patent
Rajput et al.

(10) Patent No.: US 11,558,737 B2
(45) Date of Patent: Jan. 17, 2023

(54) METHODS, SYSTEMS, AND COMPUTER READABLE MEDIA FOR PREVENTING SUBSCRIBER IDENTIFIER LEAKAGE

(71) Applicant: Oracle International Corporation, Redwood Shores, CA (US)

(72) Inventors: Jay Rajput, Bangalore (IN); Shashikiran Bhalachandra Mahalank, Bangalore (IN); Prateek Wadhwa, Hisar (IN); Venkata Grandhi, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/145,143

(22) Filed: Jan. 8, 2021

(65) Prior Publication Data
US 2022/0225084 A1 Jul. 14, 2022

(51) Int. Cl.
*H04W 12/06* (2021.01)
*H04W 12/00* (2021.01)
(Continued)

(52) U.S. Cl.
CPC ........... *H04W 12/009* (2019.01); *H04W 8/06* (2013.01); *H04W 8/12* (2013.01); *H04W 8/186* (2013.01); *H04W 12/06* (2013.01); *H04W 12/72* (2021.01)

(58) Field of Classification Search
CPC .............................. H04W 12/00; H04W 12/72
See application file for complete search history.

(56) References Cited

U.S. PATENT DOCUMENTS

| | | |
|---|---|---|
| 1,872,857 A | 8/1931 | Wesson et al. |
| 5,835,087 A | 11/1998 | Herz et al. |

(Continued)

FOREIGN PATENT DOCUMENTS

| | | |
|---|---|---|
| CN | 1964316 | 5/2007 |
| CN | 103039049 B | 8/2016 |

(Continued)

OTHER PUBLICATIONS

"3rd Generation Partnership Project; Technical Specification Group Core Network and Terminals; 5G System; Authentication Server Services; Stage 3 (Release 16)," 3GPP TS 29,509, V16.5.0 pp. 1-60 (Sep. 2020).

(Continued)

*Primary Examiner* — Michael T Vu
(74) *Attorney, Agent, or Firm* — Jenkins, Wilson, Taylor & Hunt, P.A.

(57) ABSTRACT

A method for preventing subscriber identifier leakage from a telecommunications network includes receiving, by a security edge protection proxy (SEPP), an authentication response message authorizing a subscriber in a visitor network, wherein the authentication response message includes a home subscriber identifier used to identify the subscriber within a home network. The method further includes replacing, by the SEPP, the home subscriber identifier in the authentication response message with a visitor subscriber identifier. The method further includes forwarding, by the SEPP, the authentication response message with the visitor subscriber identifier to a visitor network.

18 Claims, 5 Drawing Sheets

(51) Int. Cl.
*H04W 12/72* (2021.01)
*H04W 8/06* (2009.01)
*H04W 8/12* (2009.01)
*H04W 8/18* (2009.01)

(56) References Cited

U.S. PATENT DOCUMENTS

| | | |
|---|---|---|
| 6,185,612 B1 | 2/2001 | Jensen et al. |
| 6,298,383 B1 | 10/2001 | Gutman et al. |
| 7,266,837 B2 | 9/2007 | Monjas-Llorente et al. |
| 8,127,016 B2 | 2/2012 | Westman et al. |
| 8,171,032 B2 | 5/2012 | Herz |
| 8,218,459 B1 | 7/2012 | Stucker |
| 8,218,490 B2 | 7/2012 | Rydnell et al. |
| 8,626,157 B2 | 1/2014 | Nas et al. |
| 8,929,360 B2 | 1/2015 | Agarwal et al. |
| 9,094,819 B2 | 7/2015 | McCann et al. |
| 9,253,163 B2 | 2/2016 | Donovan |
| 9,967,148 B2 | 5/2018 | Goyal et al. |
| 10,033,736 B2 | 7/2018 | McCann |
| 10,547,613 B1 | 1/2020 | Roths et al. |
| 10,833,938 B1 | 11/2020 | Rajput et al. |
| 10,834,571 B1* | 11/2020 | Yau ................ H04W 12/06 |
| 2003/0227894 A1 | 12/2003 | Wang et al. |
| 2005/0235000 A1 | 10/2005 | Keil |
| 2006/0078119 A1 | 4/2006 | Jee et al. |
| 2006/0155871 A1 | 7/2006 | Ilkka et al. |
| 2006/0259759 A1 | 11/2006 | Maino et al. |
| 2007/0019616 A1 | 1/2007 | Rantapuska et al. |
| 2007/0250642 A1 | 10/2007 | Thubert et al. |
| 2007/0297419 A1 | 12/2007 | Askerup et al. |
| 2008/0010669 A1 | 1/2008 | Aittola et al. |
| 2008/0039104 A1 | 2/2008 | Gu et al. |
| 2009/0080440 A1 | 3/2009 | Balyan et al. |
| 2009/0165017 A1 | 6/2009 | Syed et al. |
| 2009/0232011 A1 | 9/2009 | Li et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0291923 A1 | 11/2010 | Zhou et al. |
| 2011/0165901 A1 | 7/2011 | Baniel et al. |
| 2011/0195710 A1 | 8/2011 | Nas et al. |
| 2011/0302244 A1 | 12/2011 | McCann et al. |
| 2012/0155389 A1 | 6/2012 | McNamee et al. |
| 2012/0157047 A1 | 6/2012 | Chen et al. |
| 2012/0158994 A1 | 6/2012 | McNamee et al. |
| 2012/0226814 A1 | 9/2012 | Stucker |
| 2013/0097418 A1 | 4/2013 | Bhatt et al. |
| 2013/0151845 A1 | 6/2013 | Donovan |
| 2013/0185767 A1 | 7/2013 | Tirupachur Comerica et al. |
| 2013/0290722 A1 | 10/2013 | Kall et al. |
| 2016/0352696 A1 | 12/2016 | Essigmann et al. |
| 2017/0012824 A1 | 1/2017 | Goyal et al. |
| 2017/0214691 A1 | 7/2017 | McCann |
| 2019/0260803 A1 | 8/2019 | Bykampadi et al. |
| 2020/0036754 A1* | 1/2020 | Livanos ................ H04W 8/04 |
| 2020/0186359 A1 | 6/2020 | Chan et al. |
| 2020/0245139 A1 | 7/2020 | Nakarmi et al. |
| 2021/0083965 A1 | 3/2021 | Taft et al. |
| 2021/0250172 A1 | 8/2021 | Choyi et al. |
| 2021/0288802 A1 | 9/2021 | Muhanna et al. |
| 2021/0385286 A1 | 12/2021 | Wang et al. |
| 2022/0052992 A1 | 2/2022 | Zhang et al. |
| 2022/0124468 A1 | 4/2022 | Lu et al. |

FOREIGN PATENT DOCUMENTS

| | | |
|---|---|---|
| CN | 111163473 A | 5/2020 |
| EP | 1 848 150 A1 | 10/2007 |
| EP | 1 873 980 A1 | 1/2008 |
| EP | 3 588 862 A1 | 1/2020 |
| KR | 10-1506232 | 3/2015 |
| WO | WO 2007/125498 A1 | 11/2007 |
| WO | WO 2011/156274 A2 | 12/2011 |
| WO | WO 2020/053481 A1 | 3/2020 |
| WO | WO 2022/043130 A1 | 3/2022 |

OTHER PUBLICATIONS

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

Commonly-assigned, co-pending U.S. Appl. No. 17/314,329 for "Methods, Systems, and Computer Readable Media for Protecting Against Mass Network Function (NF) Deregistration Attacks," (Unpublished, filed May 7, 2021).

Commonly-assigned, co-pending U.S. Appl. No. 17/314,382 for "Methods, Systems, and Computer Readable Media for Single-Use Authentication Messages," (Unpublished, filed May 7, 2021).

Commonly-assigned, co-pending U.S. Appl. No. 17/314,300 for "Methods, Systems, and Computer Readable Media for Hiding Network Function Instance Identifiers," (Unpublished, filed May 7, 2021).

Commonly-assigned, co-pending U.S. Appl. No. 17/308,972 for "Methods, Systems, And Computer Readable Media For Generating And Using Single-Use Oauth 2.0 Access Tokens For Securing Specific Service-Based Architecture (SBA) Interfaces," (Unpublished, filed May 5, 2021).

Commonly-assigned, co-pending U.S. Appl. No. 17/236,775 for "Methods, Systems, and Computer Readable Media for Mitigating Network Function (NF) Update and Deregister Attacks," (Unpublished, filed Apr. 21, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

Corrected Notice of Allowability for U.S. Appl. No. 15/003,647 (dated Jun. 28, 2018).

Communication pursuant to Article 94(3) EPC for European Patent Application Serial No. 11 792 956.2 (dated Apr. 23, 2018).

Notice of Allowance and Fee(s) Due for U.S. Appl. No. 15/003,647 (dated Mar. 7, 2018).

Notice of Allowance and Fee(s) Due for U.S. Appl. No. 14/795,601 (dated Dec. 28, 2017).

Applicant Initiated Interview Summary for U.S. Appl. No. 14/795,601 (dated Nov. 24, 2017).

Non-Final Office Action for U.S. Appl. No. 15/003,647 (dated Oct. 10, 2017).

Non-Final Office Action for U.S. Appl. No. 14/795,601 (dated Aug. 18, 2017).

Notification to grant a Chinese patent for Chinese Patent Application No. ZL201180032307.4 (dated Jun. 23, 2016).

Extended European Search Report for European Application No. 11792956.2 (dated Feb. 8, 2016).

(56) References Cited

OTHER PUBLICATIONS

Notification of the Third Office Action for Chinese Application No. 201180032307.4 (dated Jan. 25, 2016).
"RADIUS," https://en.wikipedia.org/wiki/RADIUS#Accounting, pp. 1-17 (Nov. 27, 2015).
Notice of Allowance for U.S. Appl. No. 13/712,481 dated Oct. 20, 2015.
Notice of Allowance for U.S. Appl. No. 13/712,481 dated Sep. 25, 2015.
Notification of the Second Office Action for Chinese Application No. 201180032307.4 (dated Jul. 17, 2015).
Commonly-assigned, co-pending U.S. Appl. No. 14/795,601 for "Methods, Systems, and Computer Readable Media for Selective Diameter Topology Hiding," (Unpublished, filed Jul. 9, 2015).
Non-Final Office Action for U.S. Appl. No. 13/832,137 (dated Jun. 2, 2015).
Non-Final Office Action for U.S. Appl. No. 13/712,481 (dated Apr. 29, 2015).
Notice of Allowance for U.S. Appl. No. 13/154,119 dated Apr. 16, 2015.
Notice of Allowance and Applicant Initiated Interview Summary for U.S. Appl. No. 13/154,119 dated Mar. 17, 2015.
Advisory Action Before the Filing of an Appeal Brief for U.S. Appl. No. 13/712,481 (dated Mar. 11, 2015).
Email Regarding Decision to Grant for Korean Patent Application No. 2012-7034449 (dated Mar. 2, 2015).
Final Office Action for U.S. Appl. No. 13/712,481 (dated Dec. 3, 2014).
Notification of the First Office Action for Chinese Patent Application No. 201180032307.4 (dated Nov. 4, 2014).
Office Action for Korean Patent Application No. 2012-7034449 (dated Oct. 14, 2014).
Non-Final Office Action for U.S. Appl. No. 13/712,481 (dated May 8, 2014).
Notice of Preliminary Rejection for Korean Patent Application No. 2012-7034449 (dated Apr. 25, 2014).
Advisory Action for U.S. Appl. No. 13/154,119 dated Jan. 22, 2014.
Zhang et al., "TOHIP: A topology-hiding multipath routing protocol in mobile ad hoc networks," Ad Hoc Networks 21, pp. 109-122 (2014).
Final Office Action for U.S. Appl. No. 13/154,119 dated Oct. 25, 2013.
Notice of Allowance and Fee(s) Due for U.S. Appl. No. 13/021,402 (dated Sep. 9, 2013).
Non-Final Office Action for U.S. Appl. No. 13/154,119 dated May 2, 2013.
Communication of European publication number and information on the application of Article 67(3) EPC for European Patent Application No. 11792956.2 (dated Mar. 13, 2013).
"EliteDSC—LTE Roaming," http://www.elitecore.com/telecompractices/lteroaming.html, pp. 1-2 (Copyright 2013).
Non-Final Office Action for U.S. Appl. No. 13/021,402 (dated Nov. 8, 2012).
Hardt, "The OAuth 2.0 Authorization Framework", Internet Engineering Task Force (IETF) Request for Comments (RFC) 6749, pp. 1-76 (2012).
Notification of Transmittal of the International Search Report and the Written Opinion of the International Searching Authority, or the Declaration for International Application No. PCT/US2011/039285 (dated Feb. 9, 2012).
Notification of Transmittal of the International Search Report and the Written Opinion of the International Searching Authority, or the Declaration for International Application No. PCT/US2011/023752 (dated Oct. 26, 2011).
"Topology Hiding," Chapter 13, Cisco Unified Border Element (SP Edition) Configuration Guide: Distributed Model, pp. 13-1-13-10 (Mar. 29, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).
Chiba et al., "Dynamic Authorization Extensions to Remote Authentication Dial In User Service (Radius)," RFC 5176, pp. 1-31 (Jan. 2008).
"Features—Kamailio (OpenSER) SIP Server," http://www.kamailio.org/w/features/, pp. 1-3 (Copyright 2008-2015).
Rouse, M., "Platform," searchservervirtualization.techtarget.com/definition/platform, pp. 1-2 (Sep. 2006).
Leach et al., "A Universally Unique IDentifier (UUID) URN Namespace," Network Working Group, RFC 4122, pp. 1-32 (Jul. 2005).
Calhoun et al., "Diameter Base Protocol," RFC 3588, pp. 1-147 (Sep. 2003).
Calhoun et al., "Diameter Base Protocol,"draft-ietf-aaa-diameter-07, Section 6.3, p. 68 (Jul. 2001).
Calhoun et al., "Diameter Base Protocol," The Internet Society, pp. 1-64 (Mar. 2001).
Rigney et al., "RADIUS Accounting," RFC 2866, pp. 1-28 (Jun. 2000).
Rigney et al., "Remote Authentication Dial In User Service (RADIUS)," RFC 2865, pp. 1-68 (Jun. 2000).
Farago et al., "Virtual path network topology optimization using random graphs," INFOCOM '99, 18th Annual Joint Conference of the IEEE Computer and Communications Societies, vol. 2, pp. 491-496 (Mar. 1999).
Goldschlag et al., "Hiding Routing Information," Springer Berlin Heidelberg, First International Workshop Cambridge, U.K., May 30-Jun. 1, 1996, Information Hiding Lecture Notes in Computer Science, vol. 1174, pp. 137-150 (1996).
Notification of Transmittal of the International Search Report and the Written Opinion of the International Searching Authority, or the Declaration for International Application No. PCT/US2022/026418 (dated Jul. 8, 2022).
Notification of Transmittal of the International Search Report and the Written Opinion of the International Searching Authority, or the Declaration for International Application No. PCT/US2022/026417 (dated Jul. 8, 2022).
Notification of Transmittal of the International Search Report and the Written Opinion of the International Searching Authority, or the Declaration for International Application No. PCT/US2022/023899 (dated Jul. 1, 2022).
Notice of Allowance and Fee(s) Due for U.S. Appl. No. 17/314,300 (dated Jun. 6, 2022).
Non-Final Office Action for U.S. Appl. No. 17/314,382 (dated May 23, 2022).
Notification of Transmittal of the International Search Report and the Written Opinion of the International Searching Authority, or the Declaration for U.S. Patent Application Serial No. PCT/US2021/064102 (dated Apr. 7, 2022).
Ericsson, "New Solution to KI#5: End-to-end integrity protection of HTTP body and method," 3GPP TSG-SA3 Meeting #102Bis-e, pp. 1-3 (Mar. 1-5, 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
Nokia et al., "Integrity protection of service request in indirect communication," 3GPP TSG-SA3, Meeting#100e, pp. 1-3 (Aug. 17-28, 2020).
"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-131 (Jul. 2020).
"5G; Security architecture and procedures for 5G System (3GPP TS 33.501 version 16.6.0 Release 16)," ETSI TS 133 501, V16.6.0, pp. 1-258 (Apr. 2021).
Non-Final Office Action for U.S. Appl. No. 17/308,972 (dated Aug. 5, 2022).

(56) References Cited

OTHER PUBLICATIONS

Notification of Transmittal of the International Search Report and the Written Opinion of the International Searching Authority, or the Declaration for International Application No. PCT/US2022/023894 (dated Aug. 1, 2022).

"3rd Generation Partnership Project; Technical Specification Group Services and System Aspects; Study on Enhancements to the Service-Based Architecture (Release 16)," 3GPP TR 23.742, V1.0.0, pp. 1-101 (Sep. 2018).

* cited by examiner

METHODS, SYSTEMS, AND COMPUTER READABLE MEDIA FOR PREVENTING SUBSCRIBER IDENTIFIER LEAKAGE

TECHNICAL FIELD

The subject matter described herein relates to preventing subscriber identifier leakage. More particularly, the subject matter described herein relates to methods, systems, and computer readable media for preventing subscriber identifier leakage in 5G telecommunications networks.

BACKGROUND

The 3rd Generation Partnership Project (3GPP) is a collaboration between groups of telecommunications standards associations. The 3GPP defined mobile phone system specifications for telecommunications networks including 3G, 4G, and Long Term Evolution (LTE) networks.

The next generation network for 3GPP is the 5G network. The 5G specifications target high data rates, reduced latency, energy saving, cost reduction, higher system capacity, and increasing numbers of connected devices.

The 5G system architecture introduces the security edge protection proxy (SEPP) as the entity sitting at the perimeter of a public land mobile network (PLMN). The SEPP can protect messages that are sent over interfaces between different networks. The SEPP can be configured as the node that:
  receives all service layer messages from the Network Function and protects them before sending them out of the network on the N32 interface and
  receives all messages on the N32 interface and forwards them to the appropriate Network Function after verifying security, where present.

The SEPP implements application layer security for all the service layer information exchanged between two NFs across two different PLMNs.

The 5G system architectures includes a subscriber permanent identifier (SUPI) for subscribers. The SUPI is a globally unique identifier allocated to each subscriber in the 5G system. 5G has introduced concepts like the subscription concealed identifier (SUCI) to make sure that the SUPI remains confidential and known only to user equipment (UE) and the network.

During a roaming scenario, the SUPI needs to be shared with a visitor network for 5G service-based interface (SBI) service access. Sharing the SUPI with visitor network, however, opens up the possibility of SUPI leakage. SUPI can leak from the visitor network because of compromised security in visitor network. For example, the visitor access and mobility management function (AMF) can be compromised and may be leaking data. Data leaks from a visitor network may not be exposed for days and months, and leaked SUPIs may already be sold on the dark web by the time the leaks are exposed.

In light of these and other difficulties, there exists a need for methods, systems, and computer readable media for preventing subscriber identifier leakage.

SUMMARY

A method for preventing subscriber identifier leakage from a telecommunications network includes receiving, by a security edge protection proxy (SEPP), an authentication response message authorizing a subscriber in a visitor network, wherein the authentication response message includes a home subscriber identifier used to identify the subscriber within a home network. The method further includes replacing, by the SEPP, the home subscriber identifier in the authentication response message with a visitor subscriber identifier. The method further includes forwarding, by the SEPP, the authentication response message with the visitor subscriber identifier to a visitor network.

According to another aspect of the subject matter described herein, the method includes receiving a request message from the visitor network, the request message including the visitor subscriber identifier; replacing the visitor subscriber identifier in the request message with the home subscriber identifier; and forwarding the request message with the home subscriber identifier to a destination node within the home network.

According to another aspect of the subject matter described herein, the method includes receiving a response message form the destination node within the home network, the response message including the home subscriber identifier; replacing the home subscriber identifier in the response message with the visitor subscriber identifier; and forwarding the response message with the visitor subscriber identifier to the visitor network.

According to another aspect of the subject matter described herein, the method includes creating an association between the visitor subscriber identifier and the home subscriber identifier in a mapping of subscriber identifiers.

According to another aspect of the subject matter described herein, the method includes forwarding a request message from the visitor network including the visitor subscriber identifier by accessing the mapping of subscriber identifiers; looking up the visitor subscriber identifier in the mapping to find the home subscriber identifier; and replacing the visitor subscriber identifier in the request message with the home subscriber identifier.

According to another aspect of the subject matter described herein, the method includes forwarding a response message from a node within the home network including the visitor subscriber identifier by: accessing the mapping of subscriber identifiers; looking up the home subscriber identifier in the mapping to find the visitor subscriber identifier; and replacing the home subscriber identifier in the response message with the visitor subscriber identifier.

According to another aspect of the subject matter described herein, the home network is a 5G network and the home subscriber identifier is a subscriber permanent identifier (SUPI).

According to another aspect of the subject matter described herein, forwarding the authentication response message with the visitor subscriber identifier to the visitor network comprises forwarding the authentication response message to a visitor SEPP of the visitor network.

According to another aspect of the subject matter described herein, receiving the authentication response message comprises receiving the authentication response message from a unified data management (UDM) node by way of an authentication service function (AUSF).

According to another aspect of the subject matter described herein, the authentication response message authorizes the subscriber for roaming on the visitor network.

According to another aspect of the subject matter described herein, a system for preventing subscriber identifier leakage from a telecommunications network includes a security edge protection proxy (SEPP) including at least one processor and a memory. The system further includes a subscriber identifier replacer implemented by the at least one processor and configured for receiving an authentication response message authorizing a subscriber in a visitor network, wherein the authentication response message includes a home subscriber identifier used to identify the subscriber within a home network; replacing the home subscriber identifier in the authentication response message with a visitor subscriber identifier; and forwarding the authentication response message with the visitor subscriber identifier to a visitor network.

According to another aspect of the subject matter described herein, the subscriber identifier replacer is configured for: receiving a request message from the visitor network, the request message including the visitor subscriber identifier; replacing the visitor subscriber identifier in the request message with the home subscriber identifier; and forwarding the request message with the home subscriber identifier to a destination node within the home network.

According to another aspect of the subject matter described herein, the subscriber identifier replacer is configured for: receiving a response message form the destination node within the home network, the response message including the home subscriber identifier; replacing the home subscriber identifier in the response message with the visitor subscriber identifier; and forwarding the response message with the visitor subscriber identifier to the visitor network.

According to another aspect of the subject matter described herein, the subscriber identifier replacer is configured for creating an association between the visitor subscriber identifier and the home subscriber identifier in a mapping of subscriber identifiers.

According to another aspect of the subject matter described herein, the subscriber identifier replacer is configured for forwarding a request message from the visitor network including the visitor subscriber identifier by: accessing the mapping of subscriber identifiers; looking up the visitor subscriber identifier in the mapping to find the home subscriber identifier; and replacing the visitor subscriber identifier in the request message with the home subscriber identifier.

According to another aspect of the subject matter described herein, the subscriber identifier replacer is configured for forwarding a response message from a node within the home network including the visitor subscriber identifier by: accessing the mapping of subscriber identifiers; looking up the home subscriber identifier in the mapping to find the visitor subscriber identifier; and replacing the home subscriber identifier in the response message with the visitor subscriber identifier.

According to another aspect of the subject matter described herein, the home network is a 5G network and the home subscriber identifier is a subscriber permanent identifier (SUPI).

According to another aspect of the subject matter described herein, forwarding the authentication response message with the visitor subscriber identifier to the visitor network comprises forwarding the authentication response message to a visitor SEPP of the visitor network.

According to another aspect of the subject matter described herein, receiving the authentication response message comprises receiving the authentication response message from a unified data management (UDM) node by way of an authentication service function (AUSF).

According to another aspect of the subject matter described herein, the authentication response message authorizes the subscriber for roaming on the visitor network.

According to another aspect of the subject matter described herein, a non-transitory computer readable medium having stored thereon executable instructions that when executed by a processor of a computer control the computer to perform steps is provided. The steps include receiving, by a security edge protection proxy (SEPP), an authentication response message authorizing a subscriber in a visitor network, wherein the authentication response message includes a home subscriber identifier used to identify the subscriber within a home network; replacing, by the SEPP, the home subscriber identifier in the authentication response message with a visitor subscriber identifier; and forwarding, by the SEPP, the authentication response message with the visitor subscriber identifier to a visitor network.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for preventing subscriber identifier leakage from a telecommunications network.

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

The 5G system architectures includes a subscriber permanent identifier (SUPI) for subscribers. The SUPI is a globally unique identifier allocated to each subscriber in the 5G system. 5G has introduced concepts like the subscription concealed identifier (SUCI) to make sure that the SUPI remains confidential and known only to user equipment (UE) and the network.

During a roaming scenario, the SUPI needs to be shared with a visitor network for 5G SBI service access. Roaming refers to the ability for a cellular customer to automatically make and receive voice calls, send and receive data, or access other services, including home data services, when travelling outside the geographical coverage area of the home network, by using a visitor network. For example, should a subscriber travel beyond their cell phone company's transmitter range, their cell phone would automatically hop onto another phone company's service, if available.

"Home network" refers to the network the subscriber is registered with. "Visitor network" refers to the network a subscriber roams temporarily and is outside the bounds of the "home network."

Sharing the SUPI with visitor network, however, opens up the possibility of SUPI leakage. SUPI can leak from the visitor network because of compromised security in visitor network. For example, the visitor access and mobility management function (AMF) can be compromised and may be leaking data. Data leaks from a visitor network may not be exposed for days and months, and leaked SUPIs may already be sold on the dark web by the time the leaks are exposed.

The third generation partnership project (3GPP) technical specification 33.501 defines 5G authorization procedures and other security procedures. The security anchor function (SEAF) may initiate an authentication with the UE during any procedure establishing a signalling connection with the UE, according to the SEAF's policy.

The UE can use SUCI or 5G-GUTI in the Registration Request. The SEAF shall invoke the Nausf_UEAuthentication service by sending a Nausf_UEAuthentication_Authenticate Request message to the AUSF whenever the SEAF wishes to initiate an authentication. The SEAF shall include the SUPI in the Nausf_UEAuthentication_Authenticate Request message in case the SEAF has a valid 5G-GUTI and re-authenticates the UE. Otherwise the SUCI is included in Nausf_UEAuthentication_Authenticate Request.

Upon receiving the Nausf_UEAuthentication_Authenticate Request message, the AUSF shall check that the requesting SEAF in the serving network is entitled to use the serving network name in the Nausf_UEAuthentication_Authenticate Request by comparing the serving network name with the expected serving network name. The AUSF shall store the received serving network name temporarily. If the serving network is not authorized to use the serving network name, the AUSF shall respond with "serving network not authorized" in the Nausf_UEAuthentication_Authenticate Response.

5G AKA enhances the authorization procedure by providing the home network with proof of successful authentication of the UE from the visited network. The proof is sent by the visited network in an Authentication Confirmation message. The authentication procedure for 5G AKA works as described in 3GPP TS 33.501. SUPI is returned in Nausf_UEAuthentication response. The same SUPI is then used in different messages by Visitor PLMN NF consumer in SBI service access requests.

Table 1 shows inter-PLMN messages from a visitor PLMN to a home PLMN.

TABLE 1

| Service Name | V-PLMN Consumer | Inputs |
| --- | --- | --- |
| Npcf_UEPolicyControl | V-PCF | SUPI |
| Nudm_SDM | AMF | SUPI |
| Nudm_UECM | AMF | SUPI |
| Nausf_UEAuthentication | AMF | SUCI |
| Nsmf_PDUSession | V-SMF | SUPI |
| Nssf_NSSelection | V-NSSF | PLMN ID of the SUPI |
| Nnrf_Disc, Nnrf_Nfm | V-NRF | Optional SUPI |

Instead of providing the home SUPI in the authentication procedure, as described in 3GPP TS 33.501, the SEPP can return a pseudo-SUPI (or "visitor SUPI") in the authentication response. The visitor SUPI can then be used in different messages by the visitor network in service access requests.

Figure 1:
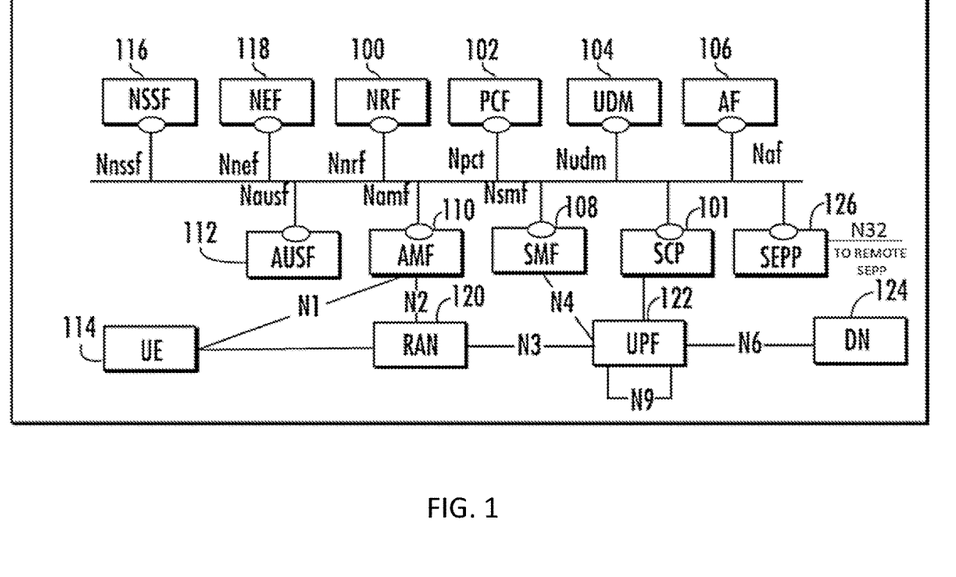
FIG. 1 is a block diagram illustrating an exemplary 5G system network architecture.

This solution can provide one or more of the following advantages:
  Prevents SUPI leakage which avoids further attacks.
  Easy to implement at SEPP.
  Applicable to multiple interfaces—nudm-sdm, nudm-uecm, npcf-uepolicy, nsmf-pdusession FIG. 1 is a block diagram illustrating an exemplary 5G system network architecture. The architecture in FIG. 1 includes NRF 100 and SCP 101, which may be located in the same home public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP Technical Specification (TS) 29.510.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

SEPP 126 is configured for receiving an authentication response message authorizing a subscriber in a visitor network. The authentication response message includes a home subscriber identifier used to identify the subscriber within a home network. SEPP 126 can then be configured for replacing the home subscriber identifier in the authentication response message with a visitor subscriber identifier. SEPP 126 can then be configured for forwarding the authentication response message with the visitor subscriber identifier to a visitor network.

Figure 2:
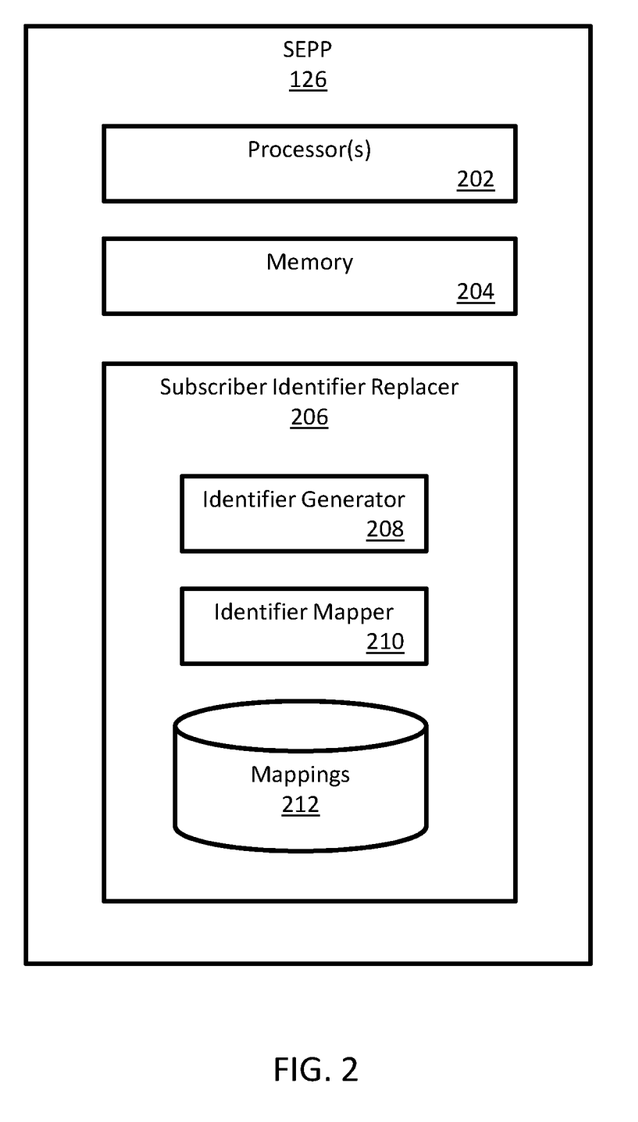
FIG. 2 is a block diagram of an example SEPP.

FIG. 2 is a block diagram of an example SEPP 126. SEPP 126 includes at least one processor 202 and memory 204. SEPP 126 includes a subscriber identifier replacer 206 implemented by the at least one processor 202.

Subscriber identifier replacer 206 includes an identifier generator 208 and an identifier mapper 210. Identifier generator 208 is configured for generating visitor SUPIs for providing to visitor networks. For example, identifier generator 208 can use any appropriate method for generating unique subscriber identifiers to generate new, unique subscriber identifiers for subscribers that are different form subscriber identifiers used on a home network.

Identifier mapper 210 is configured for creating associations between visitor SUIPs and home (actual, or real) SUPIs used on the home network within a database of mappings 212 between home SUPIs and visitor SUPIs. Although this specification describes SEPP 126 as working with SUPIs, in general, SEPP 126 can use any types of subscriber identifier that is used within a home network and sent to a visitor network.

Subscriber identifier replacer 206 is configured for:
  receiving a request message from the visitor network, the request message including the visitor subscriber identifier;
  replacing the visitor subscriber identifier in the request message with the home subscriber identifier; and
  forwarding the request message with the home subscriber identifier to a destination node within the home network.

Subscriber identifier replacer 206 is further configured for handling additional requests from the subscriber after the subscribed is authorized on the visitor network. For example, subscriber identifier replacer 206 is configured for:
  receiving a response message from the destination node within the home network, the response message including the home subscriber identifier;
  replacing the home subscriber identifier in the response message with the visitor subscriber identifier; and
  forwarding the response message with the visitor subscriber identifier to the visitor network.

Subscriber identifier replacer 206 can then be further configured for handling responses to requests related to the subscriber after the subscriber makes requests form the visitor network. For example, subscriber identifier 206 can be configured for:
  receiving a response message from the destination node within the home network, the response message including the home subscriber identifier;
  replacing the home subscriber identifier in the response message with the visitor subscriber identifier; and
  forwarding the response message with the visitor subscriber identifier to the visitor network.

In general, subscriber identifier replacer 206 works by creating associations between SUPIs and visitors SUPIs generated by identifier generator 208 in the database of mappings 212. When requests are received from visitor networks, SEPP 126 replaces the visitor SUPIs with home SUPIs by accessing the database of mappings 212, looking up home SUPIs, and replacing the visitor SUPIs with home SUPIs. When responses are received from nodes within the home network, SEPP 126 replaces the home SUPIs with visitor SUPIs by accessing the database of mappings 212, looking up visitor SUPIs, and replacing the home SUPIs with visitors SUPIs.

Subscriber identifier replacer 206 can be configured to identify messages for subscriber identifier replacement using any appropriate technique. For example, subscriber identifier replacer 206 can store a list of message types or interface types for subscriber identifier replacement. Then, when SEPP 126 receives a messages matching one of the message types on the list, subscriber identifier performs subscriber identifier replacement. A list is just an example and, in general, any appropriate data structure or technique can be used for identifying messages for subscriber identifier replacement.

In some examples, subscriber identifier replacer 206 is configured to check certain outbound messages (destined to a visitor network) to determine if the messages include the home subscriber identifier. If a message does include the home subscriber identifier, then subscriber identifier replacer 206 replaces the home subscriber identifier with the visitor subscriber identifier before forwarding the message to the visitor network.

Similarly, subscriber identifier replacer 206 can be configured to check certain inbound messages (originating from a visitor network) to determine if the messages include the visitor subscriber identifier. If a message does include the visitor subscriber identifier, then subscriber identifier 206 replaces the visitor subscriber identifier with the home subscriber identifier before forwarding the message within the home network.

Figure 3:
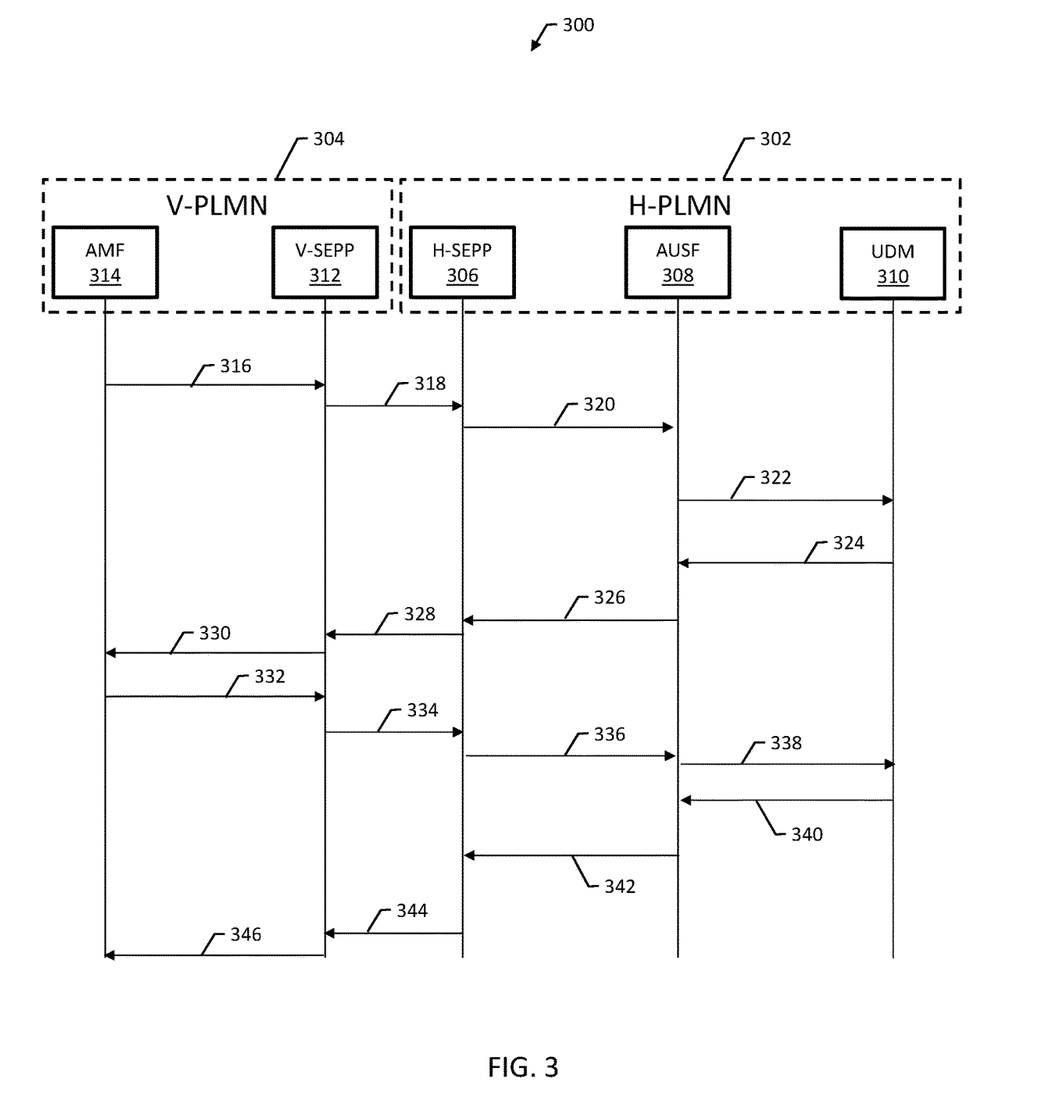
FIG. 3 is a message flow diagram illustrating messages exchanged to authenticate a UE from a visitor network during a roaming scenario.

FIG. 3 is a message flow diagram illustrating messages exchanged 300 to authenticate a UE from a visitor network during a roaming scenario.

As shown in FIG. 3, a home network includes a home PLMN 302, and a visitor network includes a visitor PLMN 304. Home PLMN 302 includes at least a home SEPP 306, an AUSF 308, and UDM 310. Visitor PLMN 304 includes at least a visitor SEPP 312 and an AMF 314.

At 316, AMF 314 sends a UE authentication request (Nausf_UEAuthentication (suci, servingNetworkName)) to the home network.

At 318, visitor SEPP 312 forwards the request to home SEPP 306.

At 320, home SEPP 306 forwards the request to AUSF 308.

At 322, AUSF 308 fetches AV and SUPI from UDM 310 (Nudm_UEAuthentication (suci, servingNetworkName)).

At 324, UDM 310 sends AV and SUPI (Nudm_UEAuthentication Response (5G HE AV, SUPI)).

At 326, AUSF 308 returns AV to AMF (Nausf_UEAuthentication Response (5G SE AV, authCtxId)). SUPI is not returned.

At 328, home SEPP 306 forwards the response to visitor SEPP 312.

At 330, visitor SEPP 312 forwards the response to AMF 314.

At 332, AMF 314 sends an authentication event (Nausf_UEAuthentication (authCtxId, resStar)).

At 334, visitor SEPP 312 forwards the event to home SEPP 306.

At 336, home SEPP 306 forwards the request to AUSF 308.

At 338, AUSF 308 sends the authentication event to UDM 310 (Nudm_UEAuthentication Req).

At 340, UDM 310 responds back to AUSF 308 (Nudm_UEAuthentication Res).

At 342, AUSF 308 respond back authentication results and SUPI (Nausf_UEAuthentication Response (authResult, SUPI)). AUSF 308 previously stored the SUPI from UDM at 324.

During a roaming scenario, the SUPI needs to be shared with the visitor network for 5G SBI service access. Sharing the SUPI with visitor network, however, opens up the possibility of SUPI leakage. SUPI can leak from the visitor network because of compromised security in visitor network. For example, AMF 314 can be compromised and may be leaking data. Data leaks from a visitor network may not be exposed for days and months, and leaked SUPIs may already be sold on the dark web by the time the leaks are exposed.

Instead of providing the home SUPI in the authentication procedure, as described in 3GPP TS 33.501, the SEPP can return a visitor SUPI in the authentication response. The visitor SUPI can then be used in different messages by the visitor network in service access requests.

Referring back to 342, Home SEPP 306 replaces the home SUPI (the actual SUPI, used within the home network) with a visitor SUPI.

At 344, home SEPP 306 forwards the updated response (with the visitor SUR) to visitor SEPP 312.

At 346, visitor SEPP 312 forwards the updated response to AMF 314. AMF 314 stores the visitor SUPI and uses the visitor SUPI as if it was the actual, home SUPI.

Figure 4:
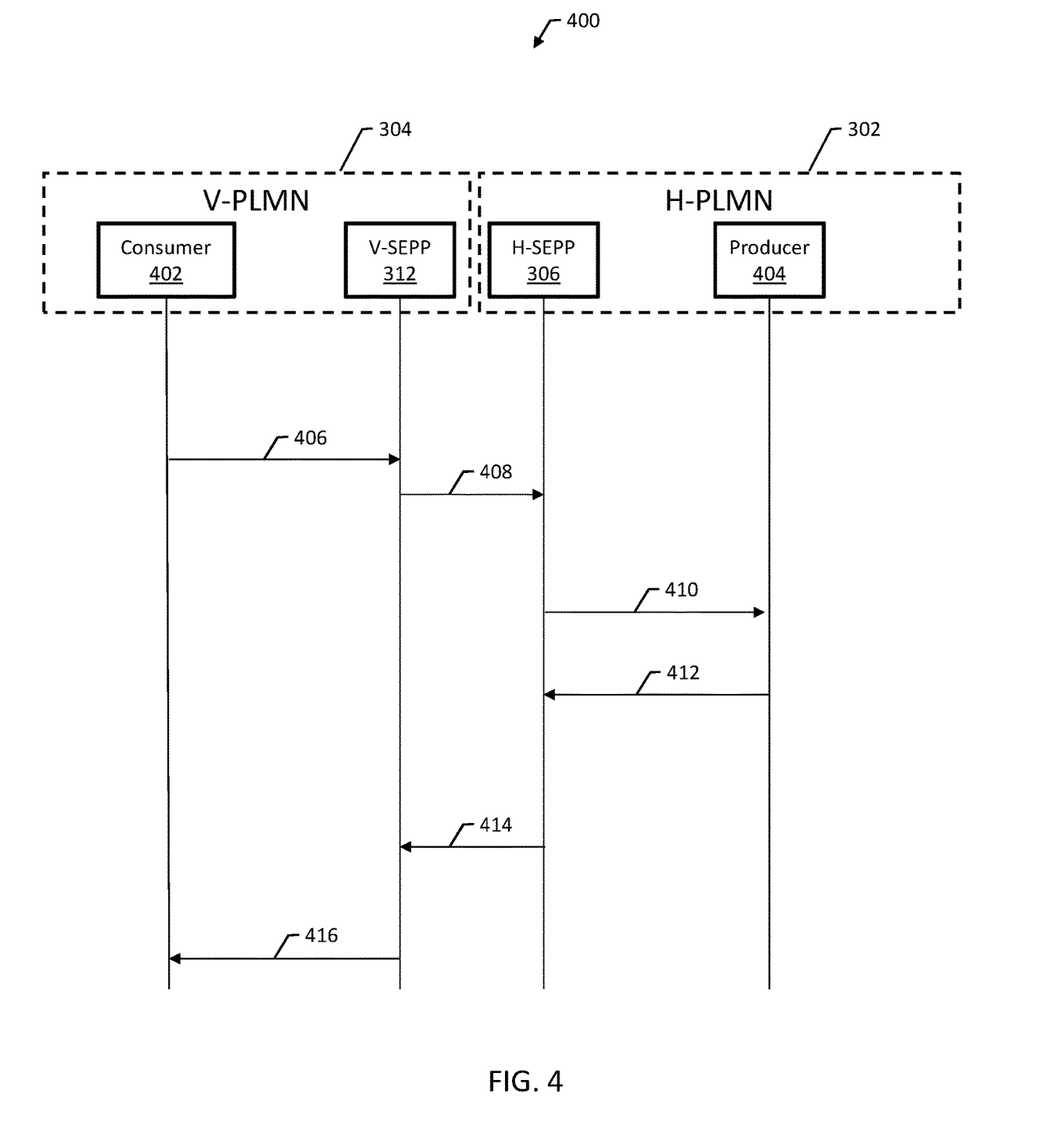
FIG. 4 is a message flow diagram illustrating messages exchanged to secure additional services for a UE from a visitor network during a roaming scenario.

FIG. 4 is a message flow diagram illustrating messages exchanged 400 to secure additional services for a UE from a visitor network during a roaming scenario.

As shown in FIG. 4, visitor PLMN 304 includes a consumer network function 402. Home PLMN 302 includes a producer network function 404.

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

At 406, consumer network function 402 sends an SBI service request including the visitor SUPI.

At 408, visitor SEPP 312 forwards the request to home SEPP 306. Home SEPP 306 replaces the visitor SUPI with the home SUPI.

At 410, home SEPP 306 forwards the request to producer network function 404.

At 412, producer network function 404 responds to the request (SBI Service Response). Home SEPP 306 checks the response message to see if it includes the home SUPI, and if it does, then home SEPP 306 replaces the home SUPI with the visitor SUPI.

At 414, home SEPP 306 forwards the response to visitor SEPP 312.

At 416, visitor SEPP 312 forwards the response to consumer network function 402.

Figure 5:
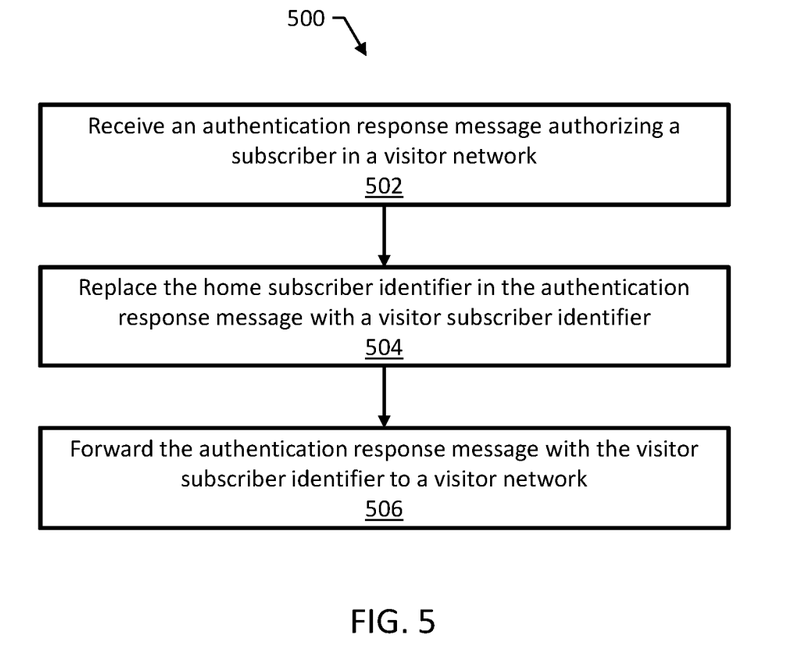
FIG. 5 is a flow diagram of an example method for preventing subscriber identifier leakage from a telecommunications network.

FIG. 5 is a flow diagram of an example method 500 for preventing subscriber identifier leakage from a telecommunications network.

Method 500 includes receiving, by a security edge protection proxy (SEPP), an authentication response message authorizing a subscriber in a visitor network. The authentication response message includes a home subscriber identifier used to identify the subscriber within a home network (502). Method 500 includes replacing, by the SEPP, the home subscriber identifier in the authentication response message with a visitor subscriber identifier (504). Method 500 includes forwarding, by the SEPP, the authentication response message with the visitor subscriber identifier to a visitor network (506).

In some examples, method 500 includes receiving a request message from the visitor network, the request message including the visitor subscriber identifier; replacing the visitor subscriber identifier in the request message with the home subscriber identifier; and forwarding the request message with the home subscriber identifier to a destination node within the home network. Then, method 500 can include receiving a response message from the destination node within the home network, the response message including the home subscriber identifier; replacing the home subscriber identifier in the response message with the visitor subscriber identifier; and forwarding the response message with the visitor subscriber identifier to the visitor network.

In some examples, method 500 includes creating an association between the visitor subscriber identifier and the home subscriber identifier in a mapping of subscriber identifiers. Then, method 500 can include forwarding a request message from the visitor network including the visitor subscriber identifier by: accessing the mapping of subscriber identifiers; looking up the visitor subscriber identifier in the mapping to find the home subscriber identifier; and replacing the visitor subscriber identifier in the request message with the home subscriber identifier.

Method 500 can also include forwarding a response message from a node within the home network including the visitor subscriber identifier by: accessing the mapping of subscriber identifiers; looking up the home subscriber identifier in the mapping to find the visitor subscriber identifier; and replacing the home subscriber identifier in the response message with the visitor subscriber identifier.

In some examples, the home network is a 5G network and the home subscriber identifier is a subscriber permanent identifier (SUR). Forwarding the authentication response message with the visitor subscriber identifier to the visitor network can include forwarding the authentication response message to a visitor SEPP of the visitor network. Receiving the authentication response message can include receiving the authentication response message from a unified data management (UDM) node by way of an authentication service function (AUSF). The authentication response message can authorize the subscriber for roaming on the visitor network.

In some examples, method 500 includes checking certain outbound messages (destined to a visitor network) to determine if the messages include the home subscriber identifier. If a message does include the home subscriber identifier, then method 500 includes replacing the home subscriber identifier with the visitor subscriber identifier before forwarding the message to the visitor network.

Similarly, method 500 can include checking certain inbound messages (originating from a visitor network) to determine if the messages include the visitor subscriber identifier. If a message does include the visitor subscriber identifier, then method 500 includes replacing the visitor subscriber identifier with the home subscriber identifier before forwarding the message within the home network.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for preventing subscriber identifier leakage from a telecommunications network, the method comprising:
   receiving, by a security edge protection proxy (SEPP), an authentication response message authorizing a subscriber in a visitor network, wherein the authentication response message includes a home subscriber identifier used to identify the subscriber within a home network;
   replacing, by the SEPP, the home subscriber identifier in the authentication response message with a visitor subscriber identifier;
   forwarding, by the SEPP, the authentication response message with the visitor subscriber identifier to the visitor network;
   receiving a request message from the visitor network, the request message including the visitor subscriber identifier;
   replacing the visitor subscriber identifier in the request message with the home subscriber identifier; and
   forwarding the request message with the home subscriber identifier to a destination node within the home network.

2. The method of claim 1, comprising:
   receiving a response message from the destination node within the home network, the response message including the home subscriber identifier;
   replacing the home subscriber identifier in the response message with the visitor subscriber identifier; and
   forwarding the response message with the visitor subscriber identifier to the visitor network.

3. The method of claim 1, comprising creating an association between the visitor subscriber identifier and the home subscriber identifier in a mapping of subscriber identifiers.

4. The method of claim 3, comprising forwarding a request message from the visitor network including the visitor subscriber identifier by:
- accessing the mapping of subscriber identifiers;
- looking up the visitor subscriber identifier in the mapping to find the home subscriber identifier; and
- replacing the visitor subscriber identifier in the request message with the home subscriber identifier.

5. The method of claim 3, comprising forwarding a response message from a node within the home network including the visitor subscriber identifier by:
- accessing the mapping of subscriber identifiers;
- looking up the home subscriber identifier in the mapping to find the visitor subscriber identifier; and
- replacing the home subscriber identifier in the response message with the visitor subscriber identifier.

6. The method of claim 1, wherein the home network is a 5G network and the home subscriber identifier is a subscriber permanent identifier (SUPI).

7. The method of claim 6, wherein forwarding the authentication response message with the visitor subscriber identifier to the visitor network comprises forwarding the authentication response message to a visitor SEPP of the visitor network.

8. The method of claim 6, wherein receiving the authentication response message comprises receiving the authentication response message from a unified data management (UDM) node by way of an authentication service function (AUSF).

9. The method of claim 6, wherein the authentication response message authorizes the subscriber for roaming on the visitor network.

10. A system for preventing subscriber identifier leakage from a telecommunications network, the system comprising:
- a security edge protection proxy (SEPP) including at least one processor and a memory; and
- a subscriber identifier replacer implemented by the at least one processor and configured for:
  - receiving an authentication response message authorizing a subscriber in a visitor network, wherein the authentication response message includes a home subscriber identifier used to identify the subscriber within a home network;
  - replacing the home subscriber identifier in the authentication response message with a visitor subscriber identifier;
  - forwarding the authentication response message with the visitor subscriber identifier to the visitor network;
  - receiving a request message from the visitor network, the request message including the visitor subscriber identifier;
  - replacing the visitor subscriber identifier in the request message with the home subscriber identifier; and
  - forwarding the request message with the home subscriber identifier to a destination node within the home network.

11. The system of claim 10, wherein the subscriber identifier replacer is configured for:
- receiving a response message from the destination node within the home network, the response message including the home subscriber identifier;
- replacing the home subscriber identifier in the response message with the visitor subscriber identifier; and
- forwarding the response message with the visitor subscriber identifier to the visitor network.

12. The system of claim 10, wherein the subscriber identifier replacer is configured for creating an association between the visitor subscriber identifier and the home subscriber identifier in a mapping of subscriber identifiers.

13. The system of claim 12, wherein the subscriber identifier replacer is configured for forwarding a request message from the visitor network including the visitor subscriber identifier by:
- accessing the mapping of subscriber identifiers;
- looking up the visitor subscriber identifier in the mapping to find the home subscriber identifier; and
- replacing the visitor subscriber identifier in the request message with the home subscriber identifier.

14. The system of claim 12, wherein the subscriber identifier replacer is configured for forwarding a response message from a node within the home network including the visitor subscriber identifier by:
- accessing the mapping of subscriber identifiers;
- looking up the home subscriber identifier in the mapping to find the visitor subscriber identifier; and
- replacing the home subscriber identifier in the response message with the visitor subscriber identifier.

15. The system of claim 10, wherein the home network is a 5G network and the home subscriber identifier is a subscriber permanent identifier (SUPI).

16. The system of claim 15, wherein forwarding the authentication response message with the visitor subscriber identifier to the visitor network comprises forwarding the authentication response message to a visitor SEPP of the visitor network.

17. The system of claim 15, wherein receiving the authentication response message comprises receiving the authentication response message from a unified data management (UDM) node by way of an authentication service function (AUSF).

18. A non-transitory computer readable medium having stored thereon executable instructions that when executed by a processor of a computer control the computer to perform steps comprising:
- receiving, by a security edge protection proxy (SEPP), an authentication response message authorizing a subscriber in a visitor network, wherein the authentication response message includes a home subscriber identifier used to identify the subscriber within a home network;
- replacing, by the SEPP, the home subscriber identifier in the authentication response message with a visitor subscriber identifier;
- forwarding, by the SEPP, the authentication response message with the visitor subscriber identifier to the visitor network;
- receiving a request message from the visitor network, the request message including the visitor subscriber identifier;
- replacing the visitor subscriber identifier in the request message with the home subscriber identifier; and
- forwarding the request message with the home subscriber identifier to a destination node within the home network.

* * * * *

UNITED STATES PATENT AND TRADEMARK OFFICE
CERTIFICATE OF CORRECTION

PATENT NO. : 11,558,737 B2
APPLICATION NO. : 17/145143
DATED : January 17, 2023
INVENTOR(S) : Rajput et al.

It is certified that error appears in the above-identified patent and that said Letters Patent is hereby corrected as shown below:

In the Specification

In Column 10, Line 15, delete "SUR)" and insert -- SUPI) --, therefor.

In Column 11, Line 63, delete "(SUR)." and insert -- (SUPI). --, therefor.

Signed and Sealed this
Tenth Day of October, 2023

Katherine Kelly Vidal
*Director of the United States Patent and Trademark Office*